US012370115B1

(12) United States Patent
Wing

(10) Patent No.: US 12,370,115 B1
(45) Date of Patent: Jul. 29, 2025

(54) TILTING INVERSION EXERCISER FOR INDEPENDENT MOVEMENT OF A USER TORSO

(71) Applicant: Gary Wing, Gainesville, FL (US)

(72) Inventor: Gary Wing, Gainesville, FL (US)

( * ) Notice: Subject to any disclaimer, the term of this patent is extended or adjusted under 35 U.S.C. 154(b) by 514 days.

(21) Appl. No.: 17/458,343

(22) Filed: Aug. 26, 2021

Related U.S. Application Data

(60) Provisional application No. 63/070,371, filed on Aug. 26, 2020.

(51) Int. Cl.
*A61H 1/02* (2006.01)
*A63B 22/20* (2006.01)

(52) U.S. Cl.
CPC ......... *A61H 1/0229* (2013.01); *A63B 22/205* (2013.01); *A61H 2201/0192* (2013.01); *A61H 2201/1619* (2013.01); *A61H 2201/1628* (2013.01); *A61H 2201/1642* (2013.01)

(58) Field of Classification Search
CPC .......... A61H 1/0229; A61H 2201/0192; A61H 2201/1619; A61H 2201/1628; A61H 2201/1642; A61H 2203/0493; A61H 2203/0481; A61H 1/0218; A61H 1/0222; A63B 22/205; A63B 23/0205; A63B 23/0211; A63B 23/0222; A63B 23/0233; A61G 13/009
USPC ........ 482/142, 143, 144, 145; 606/237, 240, 606/241; 601/23, 24
See application file for complete search history.

(56) References Cited

U.S. PATENT DOCUMENTS 3,741,200 A * 6/1973 Morin .................. A61H 1/0218 606/244
4,867,143 A * 9/1989 Morin .................. A61H 1/0218 606/244
5,957,955 A * 9/1999 Thomas ............... A61H 1/0218 601/24
7,374,520 B1 * 5/2008 Licari ................ A63B 21/0608 482/145
8,002,797 B2 * 8/2011 Mayer .................. A61H 1/0218 606/244
9,192,801 B1 * 11/2015 Gouloubev ...... A63B 21/00047
11,406,553 B2 * 8/2022 Chong ..................... A61H 1/00
2017/0119612 A1 * 5/2017 Wang ..................... A61H 1/001
(Continued)

FOREIGN PATENT DOCUMENTS

KR 101611385 B1 * 4/2016

*Primary Examiner* — Loan B Jimenez
*Assistant Examiner* — Kathleen M Fisk
(74) *Attorney, Agent, or Firm* — Maxwell L. Minch; Maxwell L Minch Esq. PA

(57) ABSTRACT

The present invention includes a tilting inversion exerciser that includes a plastic user supporting table having a carrier frame rotatably attached to a foldable base support for allowing a user and a user supporting table to be rotated and inverted relative to the base support. More specifically, this invention relates to a typical tilting inversion exerciser having an adjustable ankle alignment system to make linear adjustments of ankle center of a user relative to hip center of a user. Further, the present invention allows for the torso section of the supporting table to slide independently of the pelvic section of the supporting table and for the torso of a user to be supported in an inclined posture by means of an inclined foam wedge.

12 Claims, 5 Drawing Sheets

(56) References Cited

U.S. PATENT DOCUMENTS

| | | | | |
|---|---|---|---|---|
| 2018/0250186 | A1* | 9/2018 | Leier | A61H 1/003 |
| 2021/0100711 | A1* | 4/2021 | Hsieh | A61H 1/0229 |

* cited by examiner

TILTING INVERSION EXERCISER FOR INDEPENDENT MOVEMENT OF A USER TORSO

CROSS-REFERENCE TO RELATED APPLICATIONS

This application claims the benefit of U.S. Provisional Application No. 63/070,371 having a filing date of Aug. 26, 2020, the disclosure of which is hereby incorporated by reference in its entirety and all commonly owned.

FIELD OF INVENTION

The present invention provides for an improved tilting inversion table. More particularly, the present invention provides for supporting tables for tilting inversion tables which allow for independent movement of a user's torso separate from a user's pelvic section.

BACKGROUND

Tilting inversion exercisers are very common tools used to assist users in relief of spinal tensions and pain. Various embodiments of tilting inversion exercisers have been developed and include, at least, a user table rotatably or pivotally attached to a base support, and rotatable relative to the base support. This setup allows for tilting or inversion of a user and attempts to utilize gravity to assist in decompressing and applying traction to the spine.

However, present tiling inversion exercisers have the disadvantage of causing excessive extension of the body during inversion which extends or arches the lumbar spine excessively. The excessive extension forces created by typical tilting inversion exercisers limit traction, prohibit a user from achieving a neutral spine position during inversion and cause unwanted rotational pressures.

One disadvantage of typical tilting inversion exercisers that facilitates excessive extension of the lumbar spine and prohibits neutral spinal alignment during inversion is the inability of the torso section of the supporting table to slide independently of the fixed pelvic section of the supporting table. On typical tilting inversion exercisers, the supporting tables are securely fastened to the frame or carrier. For example, U.S. Pat. No. 5,551,937A discloses a typical tilting inversion exerciser with the supporting table securely fastened to the frame or carrier.

As a user inverts on a typical tilting inversion exerciser, leverage pressure on the pelvis against the supporting table increases as extension forces excessively extend the spine and limit traction. Typical tilting inversion exercisers have no means of producing a dynamic flexion moment to counter the strong extension forces common to typical tilting inversion exercisers and allow for neutral spinal alignment during inversion.

Thus there remains an unmet need for a tilting inversion exerciser which allows the torso section of the supporting table to slide independently of the fixed pelvic section of the supporting table to mitigate excessive extension forces common to tilting inversion exercisers, facilitating traction and allowing the user to achieve neutral spinal alignment during inversion.

U.S. Publication No. 2013/0059705A1 discloses a supporting table that has been divided into a "primary plate" to support the pelvis and an "auxiliary" plate to support the torso. However, these plates are securely fixed to the frame or carrier of the supporting table and do not allow independent motion of the torso section of the supporting table on the frame or carrier. In addition, Wang does not disclose any intention for separating the supporting table into individual plates.

Thus there remains an unmet need for a torso section of a supporting table to slide independently of the secured pelvic section of the supporting table to mitigate excessive extension forces common to typical tilting inversion exercisers.

U.S. Pat. No. 4,867,143A discloses a "reclining board running on wheels." This typical tilting inversion exerciser mounts the supporting table on the frame or carrier on wheels for unrestricted longitudinal translation of the supporting table. However, the reclining board or supporting table is not separated into a pelvic section and torso section. Furthermore, allowing the entire supporting table to slide as a unit places greater pull on the feet and ankles with minimal effect on spinal alignment or traction. As disclosed in the present invention, the torso section of the supporting table must slide independently of the secured pelvic section of the supporting table to mitigate extension forces common to typical tilting inversion exercisers and to maximize traction during inversion.

Various other typical tilting inversion exercisers have disclosed components to increase or enhance the decompression or traction effects of gravity during inversion. For example, U.S. Publication. No. 2015/0305962A1 and U.S. Publication. No. 2016/0228320A1 discloses corset or belt type devices which attach to the pelvis of a user and the foot restraint device. However, corsets or belts are not able to effectively facilitate neutral spinal alignment and do not facilitate sliding of the torso section of the supporting table independent of a fixed pelvic section.

U.S. mechanism by which a user can U.S. Pat. No. 5,718,660A to Chen discloses a mechanism by which a user can leverage two handles to move or slide the entire supporting table to increase traction. However, the leverage handles move the entire supporting table and present the aforementioned disadvantage of allowing the entire supporting table to slide as a unit.

Thus there remains an unmet need for the torso section of the supporting table to move or slide independently of the secured pelvic section to maximize the effects of gravity during inversion and to facilitate neutral spinal alignment.

Another disadvantage of typical tilting inversion exercisers that facilitates excessive extension of the spine and pressure on the feet and ankles is ankle malalignment. Ankle center is behind hip center on all typical tilting inversion exercisers because the back pads of the foot restraint device on all typical tilting inversion exercisers are attached to a metal rod which is securely attached to the longitudinal height adjustment extension. By attaching the back pads of the foot restraint device to the longitudinal height adjustment extension, the ankle center of a user on typical tilting inversion exercisers is positioned well behind the hip center of a user. During inversion, this posterior malalignment of the ankle of a user relative to the hip of a user on typical tilting inversion exercisers creates a rotational lever that increases pressure on the feet and ankles and causes excessive extension, or arching, of the lumbar spine and inhibition of traction. Accordingly, there remains an unmet need to provide for an inversion table that allows for proper ankle alignment U.S. Pat. No. 8,062,198B2 and U.S. Pat. No. 7,063,652B1 discloses typical tilting inversion exercisers that attach the back pads of the ankle restraint device securely to the longitudinal height adjustment extension. There is no typical tilting inversion exerciser on which the back pads are not securely attached to the longitudinal height adjustment extension. However, the back pads of the foot restraint device cannot be securely attached to the longitudinal height adjustment extension if the ankle of a user is to be aligned with the hip of a user.

Another disadvantage of typical tilting inversion exercisers is that the isolated movement of the front pads of the foot restraint device against the back pads of the foot restraint device does not facilitate alignment of the ankle of a user with the hip of a user. For example, U.S. Publication No. 2017/0119612A1 and U.S. Pat. No. 7,810,773B1 disclose the typical movement of the front pads of the foot restraint device toward the fixed, immovable back pads of the foot restraint device, which are securely attached to the longitudinal height adjustment extension.

However, isolated linear or rotary movement of the front pads of the foot restraint device toward the fixed back pads of the foot restraint device restraint device does not facilitate alignment of the ankle of a user with the hip of a user. Thus there remains an unmet need for a tilting inversion table which allows for the complete foot ankle restraint device, including the back pads, to be able to move or adjust in a linear direction relative to a user and the supporting table to align the center of the ankle of a user with the hip of user.

A further disadvantage of typical tilting inversion exercisers that facilitates excessive extension of the lumbar spine and prohibits neutral spinal alignment during inversion is failure to support the torso in an inclined angle on the supporting table.

Various tilting inversion exercisers have supported the lumbar spine with cushioned pads and plastic devices. For example, U.S. Publication No. 2013/0059705A1 discloses an adjustable plastic component that fits into various slots on the supporting table for the purpose of making contact with or "massaging" the lumbar spine. However, supporting the lumbar spine with a cushioned pad or plastic device may facilitate excessive extension of the lumbar spine and inhibit achieving neutral lumbar spinal alignment. In addition, lumbar pads or supports do not incline the torso of a user.

Thus there remains an unmet need to allow the torso of a user to be supported in an inclined posture to mitigate extension forces common to typical tilting inversion exercisers.

Thus there exists an unmet need to address the above-stated problems to mitigate and/or obviate the aforementioned disadvantages of the typical or conventional tilting inversion exercisers.

SUMMARY OF INVENTION

The present invention includes a tilting inversion exerciser that allows for the torso section of a supporting table to slide independently of the secured pelvic section of the supporting table to mitigate excessive extension forces common to typical tilting inversion exercisers.

The present invention further provides for the torso section of the supporting table to move or slide independently of the secured pelvic section to maximize the effects of gravity during inversion and to facilitate neutral spinal alignment.

In addition the present invention provides for the torso of a user to be supported in an inclined posture to mitigate extension forces common to typical tilting inversion exercisers. More specifically, this invention relates to a typical tilting inversion exerciser having an adjustable ankle alignment system to make linear adjustments of ankle center of a user relative to hip center of a user.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn as simplified or not-to-scale, for illustrative clarity. The figures are not intended to be production drawings. The figures (Figs.) are listed below.

Figure 1:
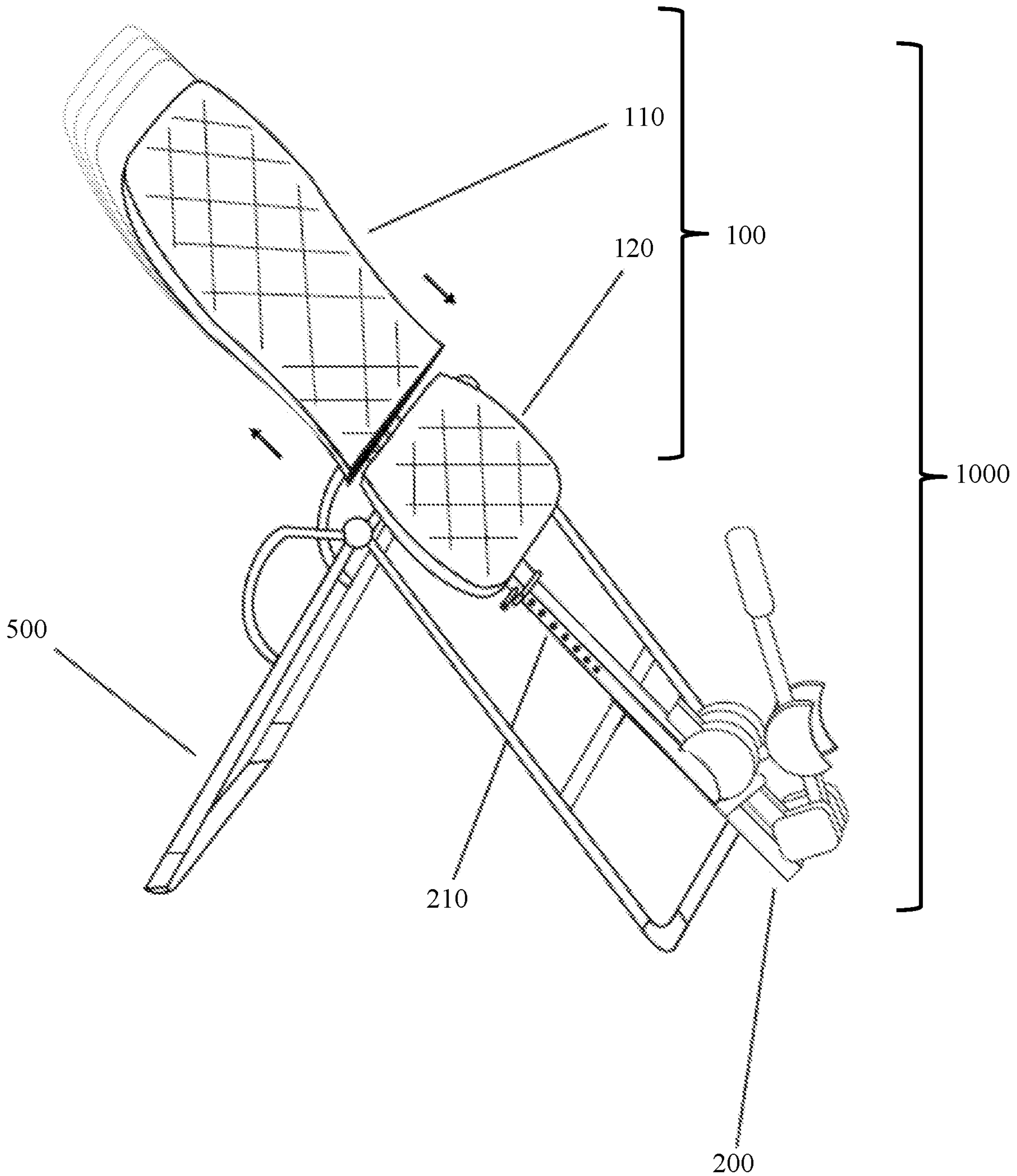
FIG. 1 illustrates of at least one embodiment of an inventive 1000 tilting inversion exerciser with a 100 supporting table having at least one 110 torso section to slide independently of the at least one 120 fixed pelvic section that allows for independent movement of the torso section of the table from the pelvic section of the supporting table, and further illustrating the 210 height adjustment beam, one embodiment of the foot restraint device all supported on a 500 rotatable frame.
Figure 2:
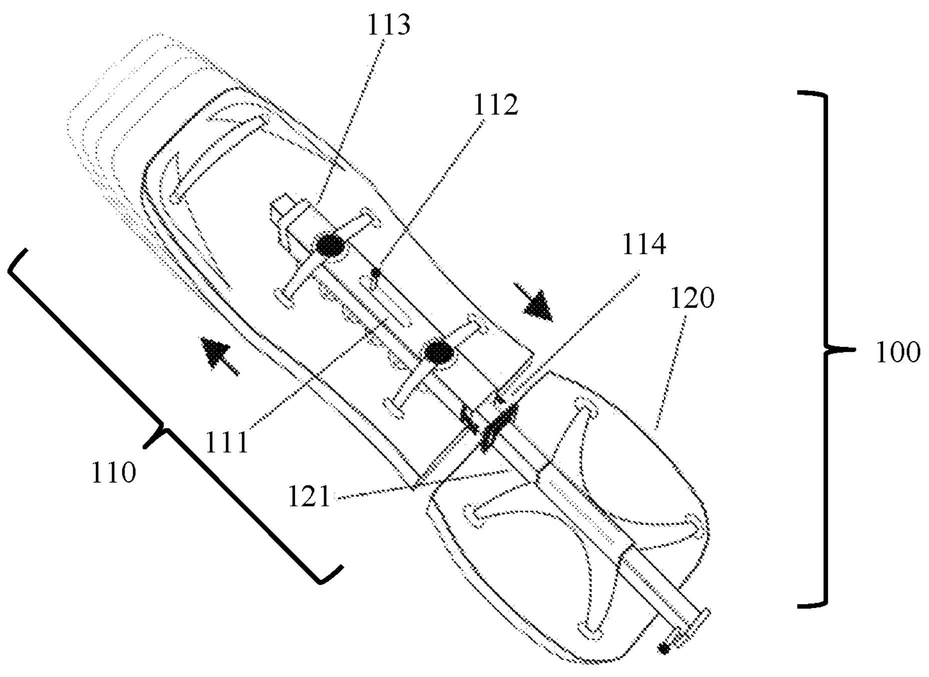
FIG. 2 illustrates the posterior view of at least one embodiment of an inventive 100 supporting table that allows the at least one 110 torso section to slide independently of the at least one 120 fixed pelvic section of the 100 supporting table, and further illustrating one or more embodiments which include a 121 center frame beam for fixation to one or more height adjustment bam (not illustrated), one or more 111 excursion channel, one or more 112 excursion limiter, one or more 113 torso sled hollow beam, and one or more 114 sled motion stops.
Figure 3:
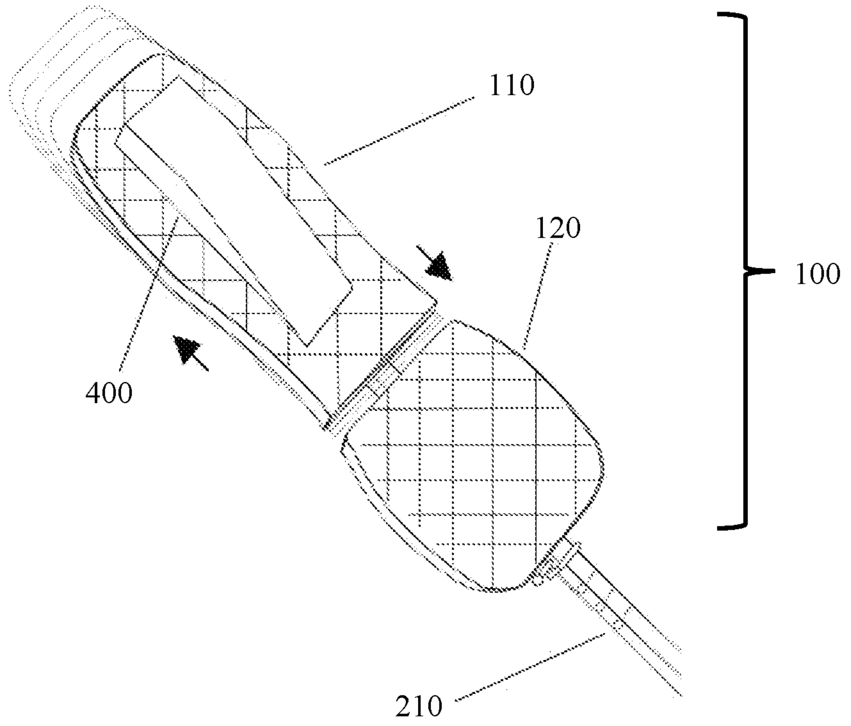
FIG. 3 illustrates at least one embodiment of an inventive 100 supporting table and portion of 210 height adjustment beam, which includes at least one independent sliding 110 torso section, at least one 120 fixed pelvic section with an inventive 400 torso wedge attached to the 110 torso section.
Figure 4:
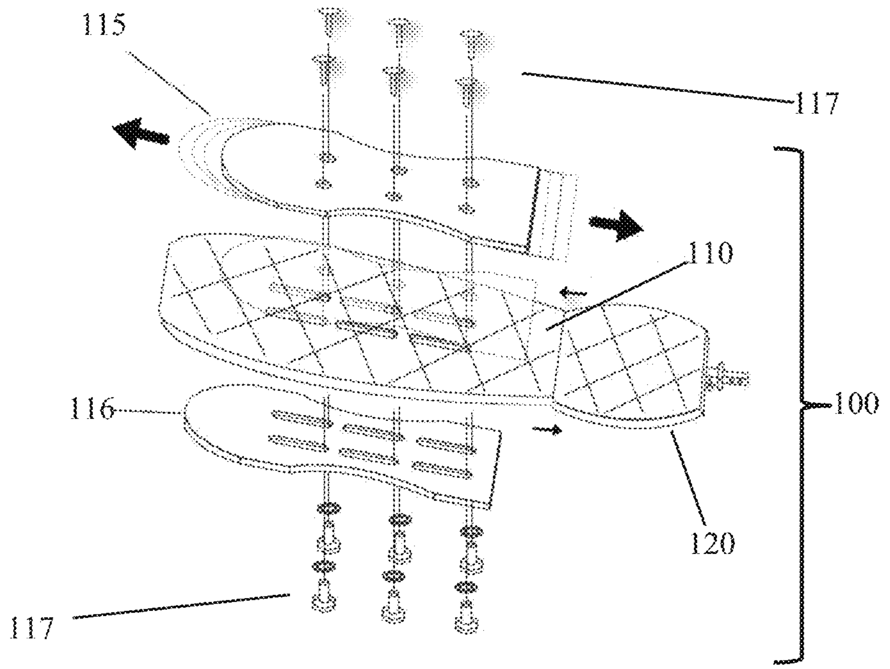
FIG. 4 illustrates an assembly view of at least one embodiment of an inventive 100 supporting table that allows for independent movement of the 110 torso section of the supporting table in relation to the fixed 120 pelvic section utilizing at least one 115 slide plate, at least one 116 posterior plate, and one or more 117 fasteners for connecting the at least one 116 posterior plate to the at least one 115 slide plate through the 110 torso section of the supporting table.
Figure 5:
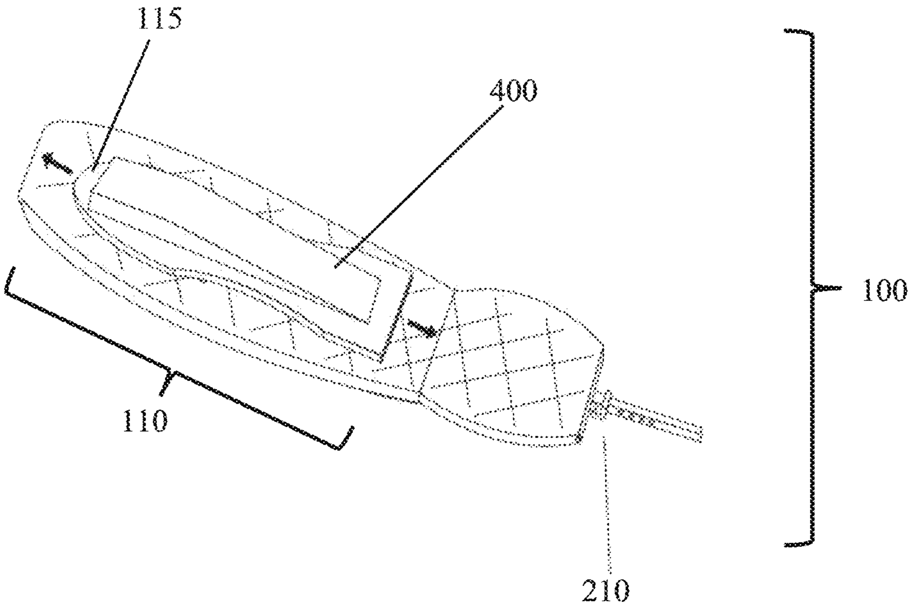
FIG. 5. illustrates an assembled view of at least one embodiment of an inventive 100 supporting table utilizing at least one 115 slide plate fastened to at least one 116 posterior plate (not shown) through the 110 torso section of the supporting table by one or more 117 fasteners (not shown), and further illustrating use of an inventive 400 torso wedge.
Figure 6:
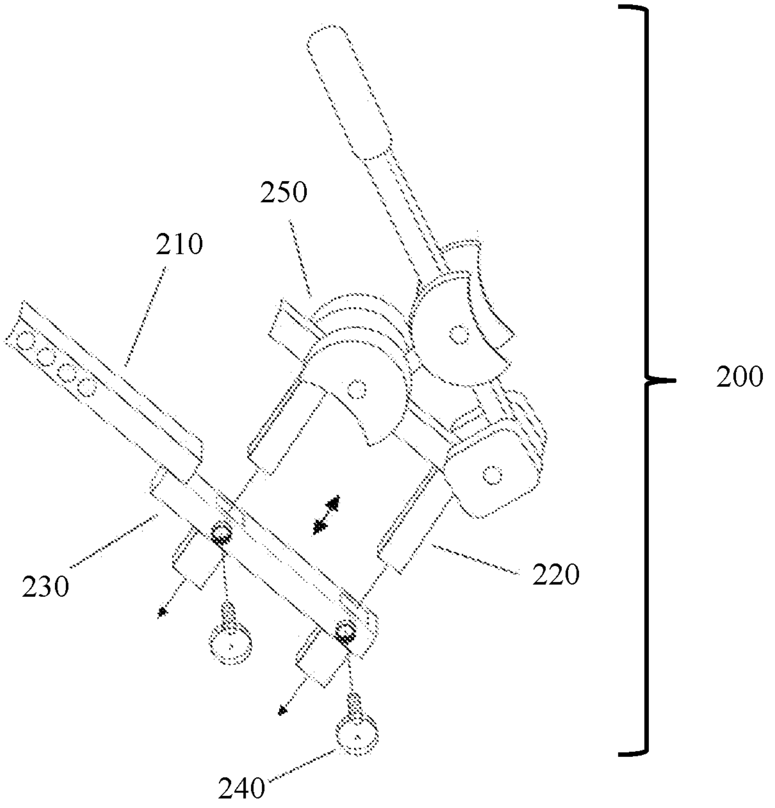
FIG. 6 illustrates an assembly view of at least one embodiment of the 200 adjustable ankle alignment system which includes at least one 210 height adjustment beam, at least one 250 vertical foot restraint device having one or more 220 projections, at least one 230 adjustment beam offset strut having one or more holes for receiving said one or more projections of said at least one vertical foot restraint device, and one or more 240 tightening mechanisms for securing said one or more projections of said at least one vertical foot restraint device to said at least one 230 adjustment beam offset strut.
Figure 7:
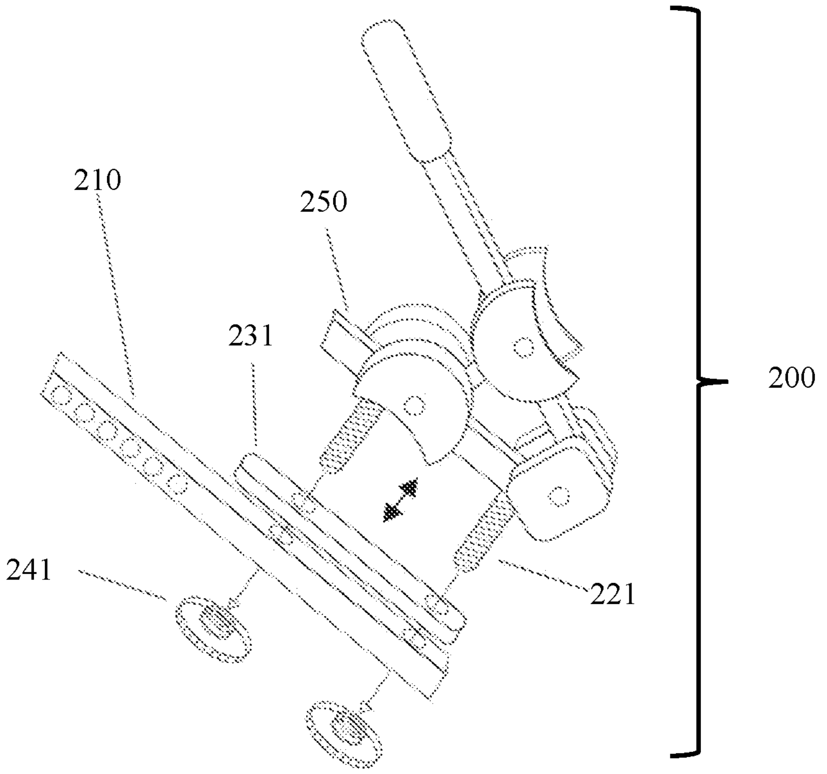
FIG. 7 illustrates an assembly view of at least one embodiment of the 200 adjustable ankle alignment system which includes at least one 210 height adjustment beam, at least one 250 vertical foot restraint device having one or more 221 threaded projections, and one or more 241 tightening mechanisms for securing said one or more projections of said at least one vertical foot restraint device to said at least one 230 adjustment beam offset strut, and at least one 231 ankle alignment spacer.
Figure 8:
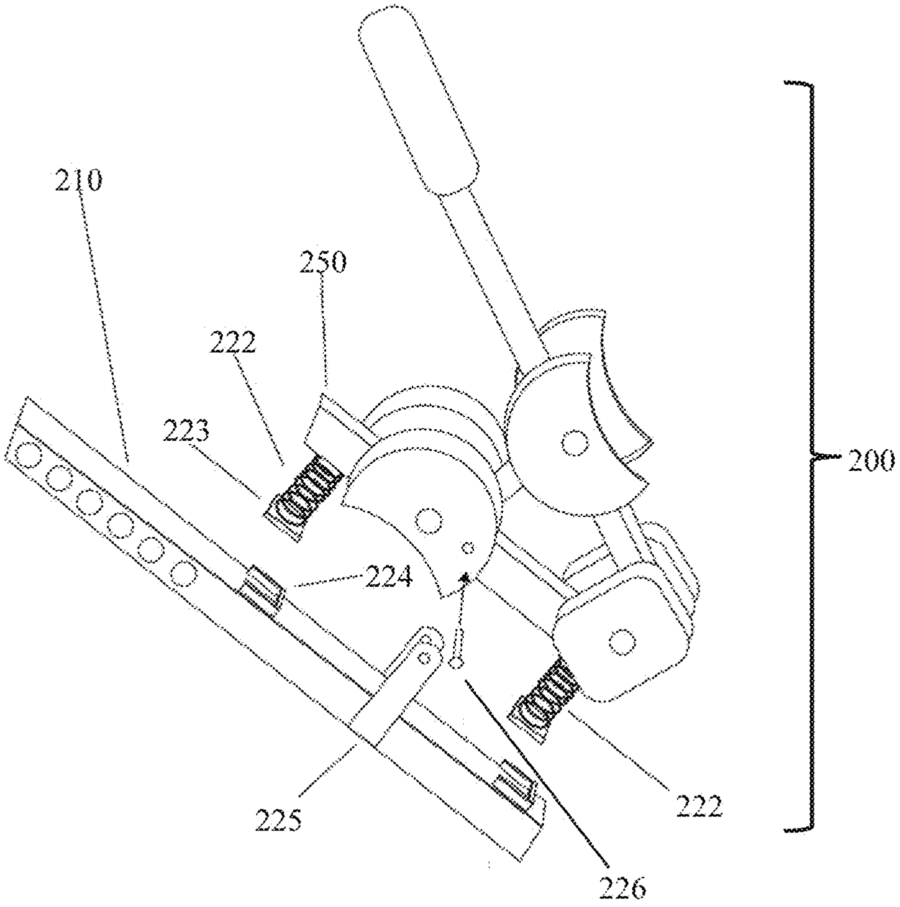
FIG. 8. provides an assembly view of at least one embodiment of the 200 adjustable ankle alignment system which includes at least one 210 height adjustment beam having at least one 224 spring plate slots and at least one 225 absorption hinge strut, at least one 226 hinge pin, and at least one 250 vertical foot restraint device having at least one 222 absorption spring and at least one 223 absorption spring plate.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION

The present invention mitigates and/or obviates the disadvantages of typical tilting inversion exercisers by properly aligning the ankles of a user with the hip of a user, allowing the torso of a user to slide independently of the pelvis of a user and allowing a user to user to assume an inclined posture. The present invention effectively mitigates and/or obviates the excessive extension forces common to typical tilting inversion exercisers, and allows a user to achieve a neutral spinal alignment with increased traction and greatly reduced rotational pressures.

As disclosed in the present invention, the torso section of the supporting table must slide independently of the fixed pelvic section of the supporting table to mitigate excessive extension forces common to tilting inversion exercisers and facilitate traction.

As disclosed in this invention, on a tilting inversion exerciser the torso section of the supporting table must move or slide independently of the secured pelvic section to maximize the effects of gravity during inversion and to facilitate neutral spinal alignment.

As disclosed in the present invention, the complete foot ankle restraint device, including the back pads, must be able to move or adjust in a linear direction relative to a user and the supporting table to align the center of the ankle of a user with the hip of user.

As disclosed in the present invention, the torso of a user must be supported in an inclined posture to mitigate extension forces common to typical tilting inversion exercisers.

Furthermore, as disclosed in the present invention, the torso section of the supporting table must slide independently of the secured pelvic section of the supporting table to mitigate excessive extension forces common to typical tilting inversion exercisers The following detailed description is exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

Sliding Torso Section

One aspect of the present invention is to provide for support tables which allow the torso section of the supporting table and torso of a user to slide longitudinally independent of the fixed pelvic section of the supporting table and pelvis of a user.

The primary means to produce a dynamic flexion moment on a tilting inversion exerciser to maximize traction and allow for neutral spinal alignment during inversion is to facilitate the torso of a user sliding independently of the fixed pelvis of a user on the supporting table.

In at least one embodiment inventive tilting inversion exercisers having a sliding torso section of the supporting table are provided. In at least one embodiment an inventive independent sliding torso section, or torso sled, of the supporting table includes at least one posterior hollow metal sled beam being square or cylindrical, one low friction liner or sleeve being square or cylindrical, at least one central beam extension being square or cylindrical, at least one posterior excursion channel, one or more central beam excursion limiters, and one or more sled motion stops.

Embodiment of the invention the torso sled provides a means to facilitate sliding of the torso section of the supporting table independent of the fixed pelvic section of the supporting table and pelvis of a user. Without being bound to a particular theory, it is believed that the independent sliding of the torso of a user allows a more neutral spine to be achieved during inversion than on typical tilting inversion exercisers. It is further believed that the independent sliding of the torso of a user on the supporting table also mitigates pressure on the pelvis during inversion common to tilting inversion exercisers and facilitates earlier and greater traction than is common to typical tilting inversion exercisers.

It should be appreciated that in certain embodiments the torso sled extends as a separate moveable plate from just above the fixed pelvic section plate of the supporting table which is securely fastened to the frame. In such embodiments, as a user begins to invert, longitudinal excursion of the torso sled on the central beam of the frame creates a gentle rotation of the torso to counter the excessive extension forces common to typical tilting inversion exercisers. At the point at which excessive pressure against the pelvis of the user from the supporting table would occur on typical tilting inversion exercisers, it is mitigated by longitudinal linear sliding and excursion of the torso sled on the central beam of the frame. This excursion of the sled facilitates earlier and greater spinal traction and allows the spine of the user to assume a more neutral alignment than is common to typical tilting inversion exercisers. In this embodiment torso sled range of motion is determined by the length of the posterior excursion channel and the position of the excursion limiter on the posterior aspect of the central beam. Torso sled motion can be blocked prior to inversion in this embodiment by engaging one or more sled motion stops.

In at least one embodiment an alternative design to facilitate sliding of the torso sled section plate of the supporting table independent of the secured pelvic section plate of the supporting table is provided. In such embodiments, an inventive sliding torso sled includes at least one posterior metal central beam outrigger, at least one central beam rail or slot, at least one metal posterior torso sled torso plate, at least two posterior torso sled wheels, at least two excursion blocks, and at least one sled locking mechanism. Embodiment of the invention provides a means to facilitate longitudinal sliding of the torso sled, independent of the fixed pelvic section, on wheels attached to the torso sled moving in tracks or slots secured to outriggers extending from the central beam of the frame. Materials in this embodiment used to facilitate motion between the torso sled and central beam outriggers include, but are not limited to bearings, low friction plastic, Teflon, and other low friction materials. In this embodiment the torso sled section is allowed unrestricted longitudinal translational movement within a secure range of motion of the torso sled. Movement of the torso sled can be blocked by tightening locking mechanisms on the carrier frame and/or supporting table prior to inversion.

In another embodiment inventive tilting inversion exercisers having a sliding torso section of the supporting table are provided. In at least one embodiment, an inventive sliding support table includes at least one slide plate 115, at least one posterior plate 116, and one or more 117 fasteners for connecting the at least one 116 posterior plate to the at least one 115 slide plate through the 110 torso section of the supporting table. In such embodiments, the at least one posterior plate is beneath the at least one torso sled, the at least one slide plate is atop the at least one torso sled, and the one or more fasteners connect the at least one posterior plate to the at least one slide plate through the at least one torso sled. In at least one embodiment, it is intended that the slide plate is capable of moving independently from the other elements of the supporting table.

It should be appreciated that in certain embodiments of the present invention, the at least one slide plate, at least one torso sled or at least one posterior plate have a plurality of holes for receiving one or more fasteners. It should be further appreciated that holes implemented into the individual components may be slotted or elongated to allow the slide plate to move several inches about said one or more fasteners.

In embodiments of the invention the glide slide, also referred to herein as the slide plate, provides a means to facilitate sliding of the torso of a user independent of the pelvic section of the supporting table and pelvis of a user. Without being bound to a particular theory, it is believed that the independent sliding of the torso of a user allows a more neutral spine to be achieved during inversion than on typical tilting inversion exercisers. It is further believed that the independent sliding of the torso of a user on the supporting table also mitigates pressure on the pelvis common to typical tilting inversion exercisers and facilitates earlier and greater traction than is common to typical tilting inversion exercisers. The assembly of plates of embodiments presented herein, are intended to be attached to at least one supporting table. In at least one embodiment the supporting table is made of plastic or other low friction synthetic material.

In certain embodiments, the glide slide may be connected to a plate, or plates, of plastic or other low friction synthetic material on the back of the supporting table through a series of elongated slots in the supporting table. In certain embodiments, it is intended that the plastic plate, or plates, are secured to the back of the supporting table and have slots which mirror those in the supporting table.

In some embodiments, one or more rigid fasteners are used extend from the top surface of the glide slide and connect through to the back of the supporting table. In at least one embodiment the fasteners are threaded locking mechanisms with low friction washers which allow for surfaces to move freely on the surface of the plastic plate. In embodiments with slotted holes, the one or more fasteners move freely in the slots in the supporting table and back plate, allowing unrestricted longitudinal excursion of the glide slide on the torso section of the supporting table.

It should be appreciated that in certain embodiments, the glide slide extends from just above the pelvis of a user to the top of the supporting table. In such embodiments, as a user begins to invert, excursion of the glide slide proximally in the slots creates a gentle rotation of the torso in the direction of flexion to counter the excessive rotation forces in the direction of extension. At the point at which pressure against the pelvis from the supporting table would normally occur on a typical tilting inversion exerciser, it is mitigated by proximal linear excursion of the slide on the supporting table. The glide slide responds to gravity and rotational pressure. As a user returns to the starting position, gravity will cause the glide slide to return to the original bottom position in the slots in the supporting table. Handles or loops attached to the top of the glide slide allow a user to manually increase traction by pulling the glide slide proximally to increase excursion of the slide in the slots. Motion of the slide can be blocked by tightening the locking mechanisms on the back of the supporting table prior to inversion.

In at least one embodiment, the glide slide is a sheet of high molecular weight plastic or other low friction plastic or synthetic material that slides on the surface of the torso section of the supporting table. However, it should be appreciated that embodiments of the invention, the surface of the glide slide and/or supporting table may incorporate other low friction materials to facilitate linear motion between the glide slide and the supporting table including, but not limited to Teflon, balls, bearings, rotary objects, rails or other low friction materials or objects.

Embodiments of the present invention provide for an independent plate which supports the head and neck of a user. In such embodiments, the independent plate is made of high molecular weight plastic or other low friction plastic or synthetic material, and is connected to the glide slide with fasteners which extend from the bottom surface of the glide slide through elongated slots in the head and neck plate. It is intended that the plate supporting the head and neck of a user is able to move independently of the glide slide and supporting table and slide longitudinally on the surface of the glide slide by excursion of the fasteners in the slots. The head and neck plate facilitates gentle traction of the cervical spine during inversion.

In embodiments where a separate torso sled section is allowed to slide on the carrier frame, independent of a fixed pelvic section, the plate supporting the head and neck of a user is attached directly to the supporting table with fasteners through elongated slots in the supporting table. In such embodiments, the plate is able to slide independently on the surface of the torso sled section of the supporting table by excursion of the fasteners in the slots in the torso sled section of the supporting table.

Ankle Alignment System

One aspect of the present invention is to mitigate/obviate posterior ankle center malalignment common in typical tilting inversion exercisers which facilitates excessive extension of the body during inversion. Embodiments of the invention solves the problem of ankle malalignment with an adjustable ankle alignment system that allows the complete foot restraint device to be incrementally adjusted linearly and perpendicular relative to a user and the supporting table to align the center of the ankle of a user with the center of the hip of a user.

In at least one embodiment an adjustable ankle alignment system for a tilting inversion exerciser is provided which allows for linear adjustments of ankle center of a user relative to hip center of a user. Such embodiments include at least one height adjustment beam, at least one adjustment beam offset strut having one or more holes for receiving one or more struts of a vertical foot restraint strut, at least one vertical restraint strut having one or more projections, and at least one foot restraint device. In such embodiments, the height adjustment beam is connected to one end of the adjustment beam offset strut and the one or more vertical foot restraint strut projections are inserted into one or more holes of said adjustment beam offset strut. The foot restraint device is connected to said at least one vertical foot restraint strut. It should be appreciated that one or more tightening mechanisms for fastening the vertical foot restraint strut projections to the adjustment beam offset strut. In at least one embodiment the vertical foot restraint strut is threaded, while in other embodiments the vertical restraint strut is unthreaded.

Embodiments of the invention, the complete foot restraint device is secured to the vertical foot restraint strut, and moves linear and perpendicular to the longitudinal height adjustment beam and supporting table. In at least one embodiment, welded projections (or projection) from the vertical foot restraint strut slide through openings (or opening) in the adjustment beam offset strut which is welded parallel to the posterior aspect of the shortened longitudinal height adjustment beam. In such embodiments, channels welded to the extension offset strut receive the projections from the vertical foot restraint strut. In such embodiments, pressure tightening mechanisms secure the projections from the vertical foot restraint strut in the channels of the adjustment beam offset strut. When the vertical foot restraint strut is tightened flush against the adjustment beam offset strut, the position of the complete foot restraint device relative to the supporting table mimics the typical tilting inversion exerciser. From this initial flush position, the vertical restraint strut, which secures the foot restraint device, can be slid or adjusted incrementally in a linear direction relative to the supporting table to align the center of the ankle of a user with the hip of a user. It should be appreciated that the projections from the vertical foot restraint strut may be incrementally moved in and out of the openings in the offset strut utilizing, but not limited to, a ratchet mechanism on the projections from the vertical restraint strut common to a drill press or other machinery. Furthermore, it should be appreciated that the adjustment knobs or handles used to engage the ratchet mechanism on the projections from the vertical restraint strut are incorporated into the adjustment beam offset strut. Brackets attached to the offset strut may be substituted for openings in the offset strut to receive projections from the vertical foot restraint strut in certain embodiments At least one embodiment of the present invention provides springs and hinge to obviate/mitigate ankle center malalignment and absorb changing rotational forces during inversion to reduce pressure on the ankles of the user. In at least one embodiment, at least two springs each with welded plates on either end are attached to opposing ends of the vertical foot restraint strut. In such embodiment, the springs on opposing ends of the vertical foot restraint strut are attached to the offset strut or main height adjustment beam via the plates on the end of each spring sliding into corresponding spring retaining slots on the offset strut or main height adjustment beam. Hinge struts with pivot holes proceeding from the offset strut are secured to the foot restraint strut with a hinge pin. This inventive hinge and spring embodiment improves ankle alignment and adapts to the varying rotational pressures during inversion, reducing foot and ankle pressure common with typical inversion exercisers.

Embodiments of the present invention, the back pads of the foot restraint device are no longer secured or confined to the longitudinal height adjustment beam, as is the case on all typical tilting inversion exercisers. The capability to slide the complete foot restraint device linearly relative to the supporting table in the present invention ensures that the center of the ankle of a user can be aligned with the hip of the user regardless of the size of the user.

Without being bound to a particular theory, it is believed that proper ankle-hip alignment during inversion allows traction forces to be centered through the joints of a user. Thus it is further believed that proper alignment minimizes rotational pressure on the feet and ankles during inversion and decreases stress on the knees. Thus the proper ankle-hip alignment facilitates traction and reduces excessive extension forces that excessively extend or arch the lumbar spine. Accordingly, it is further believed that incremental linear movements of the foot restraint device, and therefore ankle center, have a significant impact on flexion-extension forces at the lumbar spine. The capability to influence spinal alignment by incremental linear movements of the foot restraint device is a significant contribution of the present invention to tilting inversion exerciser therapy.

In at least one embodiment, the adjustable ankle alignment allows the projections of the vertical foot restraint strut, which secures the entire foot restraint device, to slide directly through openings in the longitudinal height adjustment beam, omitting the offset extension strut. In such embodiments, the aforementioned ratchet system may be utilized, or any other means to facilitate incremental linear movement of the projections of the vertical foot restraint strut through the openings in the longitudinal height adjustment beam to align the center of the ankle of a user with the center of the hip of a user.

Some embodiments of the present invention provide a static adjustable ankle alignment adjustable ankle alignment design to mitigate/obviate posterior ankle center malalignment common to typical tilting inversion exercisers. In such embodiments, the projections from the vertical foot restraint strut, which secures the complete foot restraint device, slide directly through openings in the longitudinal height adjustment beam, omitting the offset extension strut. In such embodiments, the projections from the vertical foot restraint strut include threaded ends which extend through the openings in the longitudinal height adjustment beam, allowing the vertical restraint strut to rest flush against the longitudinal height adjustment beam, positioning the foot restraint device slightly anterior relative to the supporting table. In at least one embodiment, additional spacers can be added, as needed, between the vertical foot restraint strut and the longitudinal height adjustment beam in order to position the foot restraint device more anterior relative to the supporting table and user in order to achieve the desired ankle center of a user relative to the hip center of a user. In at least one embodiment, locking mechanisms on the posterior side of the longitudinal height adjustment beam engage the threaded projections from the vertical restraint strut and are tightened to secure the foot restraint device once the desired ankle position is achieved.

Torso Wedge

Embodiments of the invention include restraining devices to positive engage the torso and pelvic section of the supporting table to the torso and pelvis of a user. Examples of suitable restraining devices include bands, straps, friction tape, adhesive, or other friction increasing materials known in the art.

Other aspects of the present invention solve the problem of supporting the torso of a user in an angle of inclination. In at least one embodiment, an inventive dual plane torso wedge is implemented with inventive tilting inversion exercisers in to facilitate maintaining the torso of a user in an angle of inclination during inversion.

Embodiments of the torso wedge provide for an inclined or semi-inclined irregular shaped wedge of foam, rubber or other compressive material that can be attached to the glide slide by a number of projections on the bottom of the wedge which engage slots and/or holes in the glide slide, or independent sliding torso section of the supporting table. In at least one embodiment, the torso wedge utilizes Velcro or other attachment materials for engagement with the glide slide, or independent sliding torso section of the supporting table. It should be appreciated, that when used, the wedge can be moved as necessary on the glide slide, or independent sliding torso section of the supporting table, to adjust to the height of a user.

In at least one embodiment, the torso wedge is narrower than the glide slide and torso sled, approximating the width between the scapula, to facilitate active rotary mobility of the spine during inversion, if desired, as well as to open the chest and position the shoulders in more optimal alignment. In at least one embodiment, the wedge is thicker at the top than the bottom, and beginning at neck level of a user, the torso wedge is approximately parallel to the supporting table and contoured to cradle the neck of a user in order to support the head and neck of a user near neutral alignment.

Certain embodiments of the inventive torso wedge acts as a lever to enhance function of the glide slide. As a user begins to invert, pressure against the torso wedge is transferred to the glide slide, dynamically activating the slide.

In embodiments where the torso sled slides independently on the carrier frame, the torso wedge dynamically activates the torso sled section of the supporting table, rather than the glide slide.

It is believed that the dynamic flexion moment created by the torso of a user positioned on a wedge during inversion creates an effective counterforce to the persistent dynamic extension forces common to typical tilting inversion exercisers which prohibit neutral spinal alignment during inversion. Accordingly it is believed that embodiments of the torso wedge effectively neutralize the strong extension forces created when a user raises the arms overhead during inversion and mitigates, in conjunction with independent sliding of the torso, excessive ribcage elevation during inversion common to typical tilting inversion exercisers. As a result, there is less compression on the diaphragm during inversion, and the compromised breathing during inversion common to typical tilting inversion exercisers is mitigated. It is further believed that the torso wedge provides proprioceptive feedback to a user. Accordingly, in embodiments where used, the support of the wedge gives a user greater initial sensory feedback during inversion which provides a sense of security for a user and enhances user control of the rate of inversion.

It is believed that use of a torso wedge alone on common tilting inversion exercisers results in an increase in friction and loss of traction during inversion. However, when the torso wedge is used in conjunction with the sliding torso embodiments and adjustable ankle systems, as disclosed herein, it facilitates rather than inhibits traction by acting as a lever to activate the torso sled or glide slide.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments.

The foregoing description is illustrative of particular embodiments of the invention, but is not meant to be a limitation upon the practice thereof. The following claims, including all equivalents thereof, are intended to define the scope of the invention.

The invention claimed is:

1. A tilting inversion exerciser, comprising:

a supporting table for supporting a subject using said tilting inversion exerciser, said supporting table further comprising:

a fixed pelvic section; and a torso sled, wherein said torso sled moves independent of said fixed pelvic section;

wherein said torso sled comprises an excursion limiter slidably engaged with an elongated excursion channel centrally located on a posterior side of said torso sled to define a range of movement of said torso sled away from said fixed pelvic section when said supporting table is inverted or partially inverted;

wherein said elongated excursion channel extends a length along a longitudinal axis of said torso sled, and said excursion limiter is slidable along the length of said elongated excursion channel; and wherein said supporting table is configured such that when a user positioned on said supporting table inverts said tilting inversion exerciser, said torso sled slides away from said fixed pelvic section a distance based on the range of movement defined by said excursion limiter and said elongated excursion channel.

2. The tilting inversion exerciser of claim 1 further comprising an ankle alignment system.

3. The tilting inversion exerciser of claim 2, wherein said ankle alignment system allows for linear adjustments of the user's ankle center relative to the user's hip center.

4. The tilting inversion exerciser of claim 2, wherein said ankle alignment system further comprises:

a height adjustment beam;

a vertical foot restraint device having one or more projections;

an adjustment beam offset strut having one or more holes for receiving said one or more projections of said vertical foot restraint device; and one or more tightening mechanism;

wherein said height adjustment beam is connected to one end of said adjustment beam offset strut;

wherein said one or more projections of said vertical foot restraint device are inserted into said one or more holes of said adjustment beam offset strut; and wherein said vertical foot restraint device is connected to said adjustment beam offset strut by said one or more tightening mechanism securing said one or more projections of said vertical foot restraint device.

5. The tilting inversion exerciser of claim 4, wherein said one or more projections of said vertical foot restraint device of said ankle alignment system is threaded.

6. The tilting inversion exerciser of claim 1, wherein said torso sled further comprises a sled motion stop to mechanically block motion of said torso sled away from said fixed pelvic section when said supporting table is inverted.

7. A supporting table for a tilting inversion exerciser, the supporting table comprising:

a fixed pelvic section; and a torso sled, wherein said torso sled comprises an excursion limiter slidably engaged with an elongated excursion channel centrally located on a posterior side of said torso sled to define a range of movement of said torso sled away from said fixed pelvic section when said supporting table is inverted or partially inverted;

wherein said elongated excursion channel extends a length along a longitudinal axis of said torso sled, and said excursion limiter is slidable along the length of said elongated excursion channel;

wherein said torso sled moves independent of said fixed pelvic section; and wherein said supporting table is configured such that when a user positioned on said supporting table inverts said tilting inversion exerciser, said torso sled slides away from said fixed pelvic section a distance based on the range of movement defined by said excursion limiter and said elongated excursion channel.

8. The supporting table of claim 7 further comprising a torso wedge to be placed between said torso sled and the user of said supporting table, wherein said torso wedge is thicker at the top than the bottom and contoured to cradle the neck of the user in order to support the head and neck of the user.

9. The supporting table of claim 7, wherein said torso sled further comprises a sled motion stop to mechanically block motion of said torso sled away from said fixed pelvic section when said supporting table is inverted.

10. A tilting inversion exerciser, comprising:

an ankle alignment system;

a supporting table for supporting a subject using said tilting inversion exerciser, said supporting table further comprising:

a fixed pelvic section; and a torso sled, wherein said torso sled moves independent of said fixed pelvic section;

wherein said ankle alignment system further comprises:

a height adjustment beam;

a vertical foot restraint device having one or more projections;

an adjustment beam offset strut having one or more holes for receiving said one or more projections of said vertical foot restraint device; and one or more tightening mechanism;

wherein said height adjustment beam is connected to one end of said adjustment beam offset strut;

wherein said adjustment beam offset strut extends parallel to said height adjustment beam;

wherein said one or more projections of said vertical foot restraint device are inserted into said one or more holes of said adjustment beam offset strut; and wherein said vertical foot restraint device is connected to said adjustment beam offset strut by said one or more tightening mechanism securing said one or more projections of said vertical foot restraint device.

11. The tilting inversion exerciser of claim 10, wherein said torso sled further comprises an excursion limiter to regulate a range of movement of said torso sled away from said fixed pelvic section when said supporting table is inverted or partially inverted.

12. The tilting inversion exerciser of claim 10, further comprising a torso wedge to be placed between said at least one torso sled and a user of said supporting table, wherein said torso wedge is thicker at the top than the bottom and contoured to cradle the neck of the user in order to support the head and neck of the user.

* * * * *